United States Patent [19]
Tsutsui

[11] Patent Number: 6,111,382
[45] Date of Patent: Aug. 29, 2000

[54] DEVICE FOR CONTROLLING TAPPING DEVICE PROVIDED WITH COMPOSITE TOOL HAVING BORING AND TAPPING SECTIONS

[75] Inventor: Katsunori Tsutsui, Nagoya, Japan

[73] Assignee: Brother Kogyo Kabushiki Kaisha, Aichi-ken, Japan

[21] Appl. No.: 09/261,323

[22] Filed: Mar. 3, 1999

[30] Foreign Application Priority Data

Mar. 3, 1998 [JP] Japan .................................. 10-050731

[51] Int. Cl.$^7$ ...................................... G05B 19/18
[52] U.S. Cl. ..................... 318/571; 318/569; 318/572; 364/424.11; 364/474.15; 470/96
[58] Field of Search ..................... 318/560–696, 318/39; 470/96, 18, 44, 181, 198; 408/8, 9; 364/474.3, 474.11, 474.15, 164, 174, 474.28, 474.21, 474.33

[56] References Cited

U.S. PATENT DOCUMENTS

| | | |
|---|---|---|
| 4,656,405 | 4/1987 | Kiya et al. ............................... 318/571 |
| 4,789,943 | 12/1988 | Yamanaka et al. ................. 364/474.28 |
| 4,813,821 | 3/1989 | Hirota ......................................... 408/9 |
| 4,879,660 | 11/1989 | Asakura et al. .................... 364/474.15 |
| 4,985,841 | 1/1991 | Iwagaya ............................. 364/474.33 |
| 5,091,860 | 2/1992 | Fujimoto ............................. 364/474.11 |
| 5,184,053 | 2/1993 | Maruo et al. ........................... 318/571 |
| 5,404,308 | 4/1995 | Kajiyama ............................. 364/474.3 |
| 5,654,894 | 8/1997 | Tsutsui ................................. 364/474.3 |
| 5,733,198 | 3/1998 | Tsutsui et al. ............................ 470/96 |

FOREIGN PATENT DOCUMENTS 10-15733  1/1998  Japan .

*Primary Examiner*—Paul Ip
*Attorney, Agent, or Firm*—Pitney, Hardin, Kipp and Szuch LLP

[57] ABSTRACT

A control device which controls a tapping device provided with a feed motor for feeding a spindle in an axial direction thereof and a spindle motor for rotating the spindle about its axis. The spindle installs a composite tool having a boring section for forming a bore in a workpiece and a subsequent tapping section for forming a female thread at the bore. An asynchronous control is initially performed for independently controlling rotation of the feed motor and the spindle motor for boring. If the tapping section reaches the workpiece, a control is switched to a synchronous control for controlling the motors in synchronism with each other.

21 Claims, 4 Drawing Sheets

DEVICE FOR CONTROLLING TAPPING DEVICE PROVIDED WITH COMPOSITE TOOL HAVING BORING AND TAPPING SECTIONS

BACKGROUND OF THE INVENTION

The present invention relates to a tapping device for forming a female thread in a workpiece, and more particularly, to a control device for controlling rotation of a feed motor and a spindle motor of a tapping device for controlling rotation speed and axial moving speed of a spindle to which a composite tool having a tip boring section and a subsequent tapping section is attached.

In a conventional tapping device, a spindle holds a composite tool having a boring section and a tapping section. The boring section is positioned at a tip end portion of the tool for forming a bore in the workpiece, and the bored portion is then subjected to tapping by the subsequent tapping section. Thus, boring and tapping can be performed continuously without changing tools.

Laid open No. Hei-10-15733 of Japanese patent application (Kokai) discloses a synchronous control in which rotation number of the spindle and feed speed thereof in a Z-axis direction are synchronized with each other, and the feed speed and the rotation numbers in the boring are switched to different feed speed and rotation numbers in the tapping.

According to the synchronous control, spindle rotation number is obtained by dividing the Z-axis feed speed by the thread formation pitch. Further, the thread formation pitch in the boring is altered to a different thread formation pitch in the tapping by a function generator in order to provide the speed and rotation numbers those required in the boring and tapping, respectively.

According to the conventional device, since tool changing work is not required for boring and tapping, entire tapping work can be performed within a shorter period in comparison with a case where a boring tool and a separate tapping tool are required. Thus, machining efficiency can be improved. Further, different Z-axis feed speeds and rotation numbers are provided for the boring and the tapping, and therefore, optimum feed speeds and rotation numbers can be provided in the boring and tapping operation, which facilitates entire machining.

However, in the synchronous control, spindle rotation control is performed based on the Z-axis feed control. Therefore, a time delay may be provided in the spindle rotation control when responding to the Z-axis feed command after the Z-axis feed control. As a result, a swell may occur in the rotation numbers of the spindle due to the time delay, to degrade a machining accuracy. More specifically, such a time delay may not occur if rotation number and Z-axis feed speed of the spindle are maintained unchanged from the start to the end of the synchronous control. However, as described above, thread formation pitch is changed by the function generator to provide a first rotation speed at boring different from a second rotation speed at tapping. Therefore, at the pitch changing phase for changing the pitch for boring control to the pitch for tapping control, the spindle rotation number cannot be promptly converged to the second rotation speed but an overshoot may occur. Consequently, a swell of rotation number may occur, which degrade machining accuracy.

SUMMARY OF THE INVENTION

It is therefore an object of the present invention to provide a control device capable of performing a highly accurate machining to a workpiece within a reduced machining period while avoiding synchronization error between the feed speed and the rotation numbers of the spindle.

This and other objects of the present invention will be attained by an improved control device for controlling a tapping device for forming a female thread in a workpiece. The tapping device includes a composite tool, a spindle, rotation drive means and feed drive means. The composite tool has a boring section and a tapping section axially aligned therewith. The spindle is rotatable about its axis and is movable in an axial direction thereof. The composite tool is attached to the spindle with the boring section being a tip end. The rotation drive means rotates the spindle about its axis. The feed drive means moves the spindle in the axial direction toward and away from the workpiece. Thus, a female thread is formed in the workpiece in a going stroke of the composite tool, and the composite tool is separated from the workpiece in a return stroke thereof. The control device includes asynchronous control means, synchronous control means, and change over control means. The asynchronous control means controls the rotation drive means and the feed drive means independently of each other. The synchronous control means controls the rotation drive means and the feed drive means in synchronism with each other. The change-over control means firstly performs a control to the asynchronous control means for forming a bore in the workpiece by the boring section, and then changes-over a control to the synchronous control means for forming the female thread at the bore by the time the tapping section reaches the workpiece.

DETAILED DESCRIPTION OF THE PREFERRED EMBODIMENTS

Figure 1:
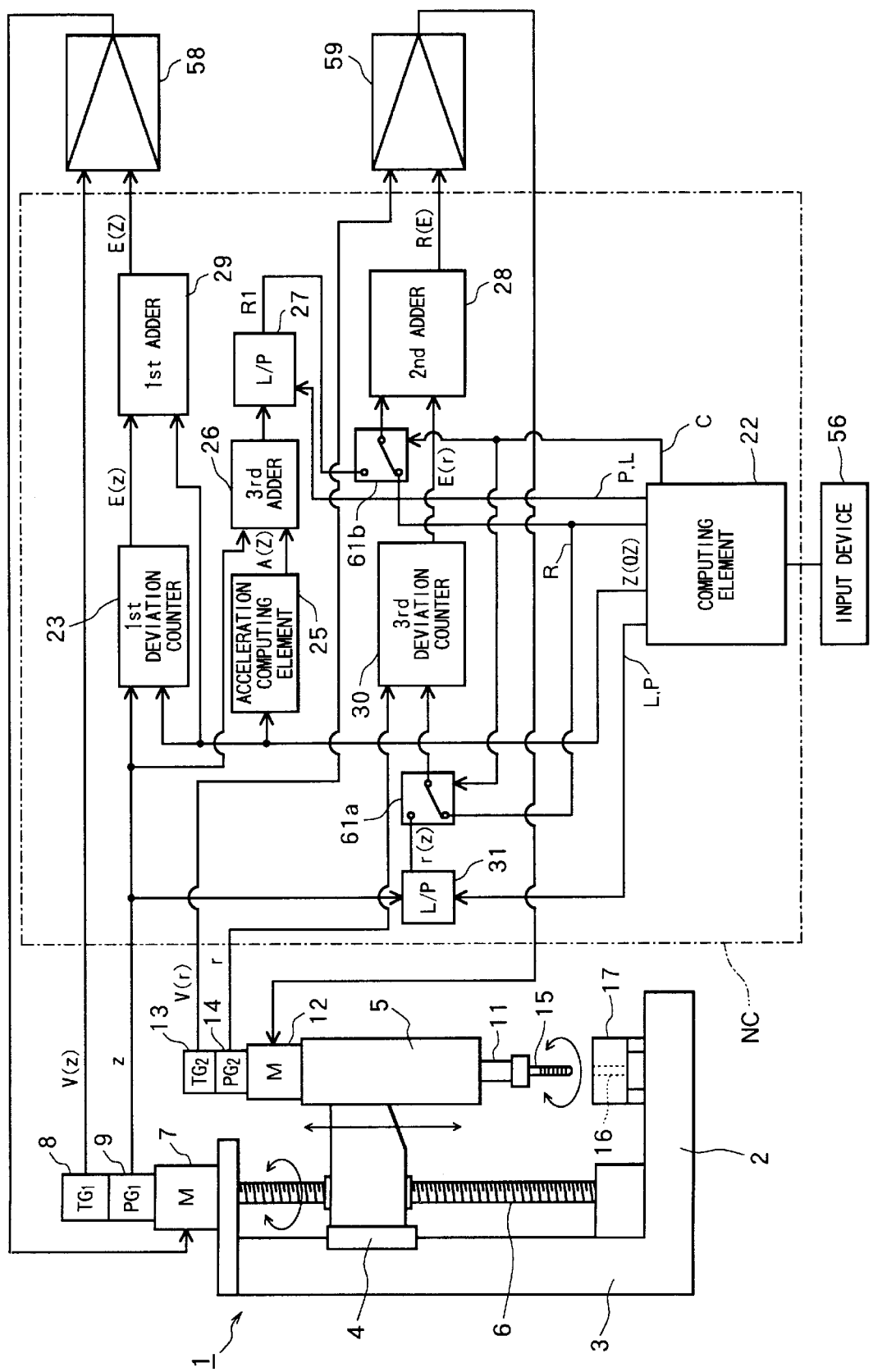
FIG. 1 is a block diagram showing a control arrangement for a tapping a workpiece according to one embodiment of the present invention.

A tapping control device according to one embodiment of the present invention will be described with reference to FIGS. 1 through 4. FIG. 1 shows a block diagram showing a control circuit and a vertical drilling machine 1 provided with a numerical control (NC) device. The present invention is applied to a combination of the control circuit and the drilling machine.

The drilling machine 1 includes a base 2, a column 3, a slider 4, a spindle head 5, a ball screw 6, a feed motor 7, a spindle 11, and a spindle motor 12. A workpiece 17 is mounted on the base 2 for machining. The column 3 upstands from the base 2 and extends in a vertical direction or Z-axis direction, and the feed motor 7 is positioned on the column 3. The ball screw 6 extends in a vertical direction and rotatable about its axis by the feed motor 7. The slider 4 is movably supported by the column 3 and is engaged with the ball screw 6. The spindle head 5 is fixedly supported to the slider 4. Upon rotation of the ball screw 6, the slider 4 is moved in the vertical direction to move the spindle head 5 in the vertical direction.

The feed motor 7 is an AC servo motor provided with a tacho generator 8 adapted to detect a rotation speed "v(z)" of the feed motor 7 and a pulse generator 9 adapted to detect the rotational position of the feed motor 7. In other words, the pulse generator 14 detects the feed, position "z" or a vertical position of the spindle head 5.

The spindle 11 is rotatably supported by the spindle head 5 and extends in parallel with the ball screw 6 and the column 3. The spindle 11 is connected to the spindle motor 12, and is rotated thereby. The spindle motor 12 is an AC servo motor provided with a tacho generator 13 adapted to detect rotation speed "v(r)" of the spindle motor 12 and a pulse generator 14 adapted to detect the rotational position "r" of the spindle motor 12.

The spindle 11 has a lower end directly provided with a composite tool 15 without intervening a tapper. The composite tool 15 is adapted for firstly boring the workpiece 17, and subsequently tapping the bore to form a female thread 16 in the workpiece 17. To this effect, the composite tool 15 has a lower boring section and an upper tapping section or female thread forming section axially aligned therewith. The boring section is in the form of a drill, a reamer or an end mill. The tapping section is in the form of a tap.

Next, a control circuit for the drilling machine will be described. The control circuit includes a numerical controller NC, an input device 56 connected to the NC, a Z-axis servo amplifier 58 connected to the NC and adapted to drive the feed motor 7, and a spindle servo amplifier 59 connected to the NC and adapted to drive the spindle motor 12. The NC controls the Z-axis servo amplifier 58 and the spindle servo amplifier 59 based on the machining command and various parameters input from the input device 56. Lead L and pitch P of the ball screw 6 are typical example of the parameters. The NC is adapted to perform synchronous and asynchronous controls with respect to the motors 7 and 12. First, asynchronous control for controlling vertical movement of the spindle head 5 (Z-axis feed system or a Z-axis asynchronous control system) will be described. For feeding the spindle head 5 in the vertical direction with an asynchronous control, a feed speed loop system is provided by a computing element 22, a first deviation counter 23, a first adder 29, the Z-axis servo amplifier 58, the tacho generator 8, and the pulse generator 9. The computing element 22 is connected to the input device 56 and the first deviation counter 23 is connected to the computing element 22 and to the pulse generator 9. The first adder 29 is connected to the first deviation counter 23 and to the computing element 22, and the Z-axis servo motor 58 is connected to the first adder 29. The feed motor 7 and the tacho generator 8 are connected to the Z-axis servo motor 58.

With this arrangement, the computing element 22 computes a feed command value "Z" based on a machining command input from the input device 56, and the computing elements outputs a pulse train corresponding to the feed command value to the first deviation counter 23. More specifically, the computing element 22 computes "Zm" and "Zt" based on the machining command input from the input device 56, wherein "Zm" is a maximum moving speed of the spindle head, and "Zt" is a minimum time period during which the spindle head reaches the maximum moving speed. Further, the computing element 22 also computes "Az" which is a maximum acceleration of the spindle head, i.e., Az=Zm/Zt. Thus, the feed command value "Z" is based on the maximum acceleration of the spindle head.

Further, the pulse generator 9 transmits another pulse train as a position feed-back signal to the first deviation counter 23. The another pulse train is indicative of the rotation angle of the feed motor 7, i.e., a feed position "z" of the spindle head 5. Then, in the first deviation counter 23, a deviation E(z)=Z−z, i.e. the difference between the feed command value "Z" and the actual feed position "z" of the spindle head 5, is computed. The deviation "E(z)" is transmitted into the first adder 29. Addition of the deviation "E(z)" and the feed command value "Z" is made in the first adder 29 to create a speed command "E(Z)" which is then transmitted to the Z-axis servo amplifier 58. This is so called, "feed forward" control so as to reduce an operational delay of the feed motor 7 responsive to the feed command value "Z".

To the Z-axis servo amplifier 58, are input the speed command "E(Z)" and a signal "v(z)" transmitted from the tacho generator 8, the signal "v(z)" serving as a speed feed-back signal which corresponds to an actual feed speed of the feed motor 7. Accordingly, the feed motor 7 is driven based on the speed command "E(Z)" and the signal "v(z)". Thus, the feed motor 7 control with the feed speed loop system is performed for vertically moving the spindle head 5.

Next, asynchronous control for controlling rotation of the spindle 11 (R-axis system or a spindle asynchronous control system) will be described. For controlling the rotation of the spindle 11 with an asynchronous control, a rotation speed loop system is provided by the computing element 22, a second deviation counter 30, a second adder 28, the spindle servo amplifier 59, the pulse generator 14, and the tacho generator 13.

The second deviation counter 30 is connected to the computing element 22 through a change-over switch 61a and to the pulse generator 14. The second adder 28 is connected to the second deviation counter 30 and to the computing element 22 through a change-over switch 61b, and the spindle servo motor 59 is connected to second first adder 28. The spindle motor 12 and the tacho generator 13 are connected to the spindle servo motor 59. Further, the computing element 22 is adapted to transmit a change-over signal "C" to the change-over switches 61a and 61b for maintaining the connection between the computing element 22 and the second deviation counter 30 and the connection between the computing element 22 and the second adder 28.

With this arrangement, the computing element 22 computes a rotation command value "R" based on a machining command input from the input device 56 similar to the above-described Z-axis feed system, and the computing elements outputs a pulse train corresponding to the rotation command value "R" to the second deviation counter 30 through the first change-over switch 61a. More specifically, the computing element 22 computes, "Rm" and "Rt" based on the machining command input from the input device 56, wherein "Rm" is a maximum rotation speed of the spindle 15, "Rt" is a minimum time period during which the spindle reaches the maximum rotation speed. Further, the computing element 22 also computes "Ar" which is a maximum acceleration of the spindle, i.e., Ar=Rm/Rt. Thus, the rotation command value "R" is based on the maximum acceleration Ar.

Further, the pulse generator 14 transmits a pulse train as a rotation feed-back signal "r" to the second deviation counter 30. The pulse train is indicative of the rotation angle of the spindle motor 12, i.e., an angular rotational position of the spindle 11. Then, in the second deviation counter 30, a deviation E(r)=R−r, i.e. the difference between the rotation command value "R" and the actual rotational position "r" of the spindle 11, is computed. The deviation "E(r)" is transmitted into the second adder 28. Addition of the deviation "E(r)" and the rotation command value "R" inputted through the second change-over switch 61b from the computing element 22 is made in the second adder 28 to create a rotation command "R(E)" which is then transmitted to the spindle servo amplifier 59.

To the spindle servo amplifier 59, are input the rotation command "R(E)" and a signal "v(r)" transmitted from the tacho generator 13, the signal "v(r)" serving as a speed feed-back signal which corresponds to an actual rotation speed of the spindle motor 12. Accordingly, the spindle motor 12 is driven based on the rotation command "R(E)" and the signal "v(r)". Thus, the spindle motor 12 control with the rotation speed loop system is performed for controlling rotation of the spindle 11.

As described above, the asynchronous control is performed by mainly the computing element 22, the deviation counters 23 and 30 and the adders 29 and 28. The above described change-over switches 61a and 61b are adapted to perform change-over operation between the asynchronous control and a synchronous control described below. For the synchronous control, an acceleration computing element 25, a third adder 26 and a rotation command computing element 27 are further employed in addition to those employed for the asynchronous control.

Next, synchronous control will be described. Synchronous control implies synchronous control to both the feed motor 7 and the spindle motor 12 in order to simultaneously control feed length and rotation of the spindle 15. First, a synchronous Z-axis feed system for vertically moving the spindle head 5 is the same as the Z-axis feed system for the asynchronous control described above except that the computing element 22 computes a feed command value "QZ" instead of "Z" and transmits the feed command value "QZ" to the first deviation counter 23.

More specifically, the computing element 22 computes, "Rm", "Rt", "Zm" and "Zt" based on the machining command input from the input device 56, wherein "Rm" is a maximum rotation speed of the spindle 15, "Rt" is a minimum time period during which the spindle reaches the maximum rotation speed, "Zm" is a maximum moving speed of the spindle head, and "Zt" is a minimum time period during which the spindle head reaches the maximum moving speed. Further, the computing element 22 also computes "Ar" and "Az", wherein "Ar" is a maximum acceleration of the spindle rotation, i.e., Ar=Rm/Rt, and "Az" is a maximum acceleration of the spindle head, i.e., Az=Zm/Zt. Furthermore, the computing element 22 compares the maximum acceleration "Ar" of the spindle with the maximum acceleration "Az" of the spindle head, and sets a lower one of "Ar" and "Az" as an acceleration "A". The computing element 22 then computes a feed command value "QZ" based on the acceleration "A", and transmits the feed command value "QZ" to the first deviation counter 23. In the synchronous control, the computing element 22 must transmit control signal to both the spindle motor 12 and the feed motor 7 for synchronous operation. The acceleration "A" is important so as not to exceed the capacities of the motors 7 and 12 in the synchronous control. The feed command value "QZ" based on the lower one of the accelerations ("Ar" or "Az") can protect both the feed motor 7 and the spindle motor 12.

The first deviation counter 23 computes a deviation E(z)=QZ−z, i.e., the difference between the feed command value "QZ" and the actual feed position "z" of the spindle head 5, the actual feed position "z" being detected by the pulse generator 9, and the deviation "E(z)" is transmitted to the first adder 29. In the first adder 29, addition of the deviation "E(z)" and the feed command value "QZ" is conducted to create a speed command "E(Z)" which is then transmitted into the Z-axis servo amplifier 58. To the Z-axis servo amplifier 58, are input the speed command "E(Z)" and the signal "v(z)" transmitted from the tacho generator 8, the signal "v(z)" corresponding to an actual feed speed of the feed motor 7. Thus, the feed motor 7 is driven based on the speed command "E(Z)" and the signal "v(z)".

Next, a synchronous spindle rotation system which controls rotation of the spindle 11 includes the computing element 22, the second deviation counter 30, the second adder 28, the spindle servo amplifier 59, an acceleration computing element 25, a third adder 26, a rotation command computing element 27, and a rotation correction computing element 31. The acceleration computing element 25 is connected to the computing element 22, the third adder 26 is connected to the acceleration computing element 25 and to the pulse generator 9. The rotation command computing element 27 is connected to the third adder 26 and to the computing element 22. Further, the rotation correction computing element 31 is connected to the computing element 22 and to the pulse generator 9. In the synchronous control, a change-over signal "C" is transmitted to the change-over switches 61a and 61b, so that the rotation correction computing element 31 can be connected to the second deviation counter 30, and the rotation command computing element 27 can be connected to the second adder 28.

In the spindle rotation system, the rotation command value "R" is not computed directly based on the machining command, but is computed based on the feed command value "QZ". That is, the feed command value "QZ" obtained from the computing element 22 is input to the acceleration computing element 25. In the computing element 25, a feed acceleration "A(Z)" is computed based on "ΔQZ", which is a feed command speed per a unit period, the unit period being 1.5 msec. for example as in the case of sampling control. In other words, "A(Z)=d/dt×ΔQZ" is computed. Then, the computed feed acceleration "A(Z)" is output to the third adder 26. A rotation feed back signal "z" is also input to the third adder 26 from the pulse generator 9.

In the third adder 26, "Δz" is added to the "A(Z)", where "Δz" is an actual feed amount of the spindle head 5 per the unit period. The sum of "Δz" and "A(Z)" implies the sum of feed amount and a feed amount differential per the unit period. In other words, an output value from the third adder 26 is "Δz+d/dt×ΔQZ".

To the rotation command computing element 27, the lead L and the pitch P of the ball screw 6 are previously input from the input device 56 through the computing element 22. Further, the above described output value "Δz+d/dt×ΔQZ" is also input to the rotation command computing element 27. In the rotation command computing element 27, the output value is multiplied by "L/P" to compute a rotation command value "R1=L/P×(Δz+d/dt×ΔQz)". This rotation command value "R1" corresponds to the sum of the feed speed and the feed speed differential, and therefore, R1 is the rotation command value predicting the subsequent movement of the spindle head 5.

The rotation command value "R1" is transmitted, through the change-over switch 61b, to the second adder 28 in which correction to the rotation command value "R1" is performed. For the correction, a pulse signal "r" indicative of the rotational position of the spindle 11 is input from the pulse generator 14 to the second deviation counter 30. Further, a pulse signal "z" indicative of the feed amount of the spindle head 5 is input from the pulse generator 9 to the rotation correcting computing element 31 in which a rotation correcting value "r(z)=(L/P)×Z" is computed, and the computed value "r(z)" is transmitted to the second deviation counter 30 through the change-over switch 61a. In the second deviation counter 30, the rotation deviation E(r) is computed based on the rotation correcting value r(z) and he rotating position "r" of the spindle 11. In the second adder 28, the rotation command value "R1" transmitted from the rotation command computing element 27 is corrected by the rotation deviation E(r) to obtain a corrected rotation command value "R(E)=R1+E(r)".

The corrected rotation command value "R(E)" is transmitted to the spindle servo amplifier 59 to which the signal "v(r)" corresponding to the rotation speed of the spindle motor 12 is also transmitted from the tacho generator 13. Thus, the spindle motor 12 is driven based on the rotation command value "R(E)" and the signal "v(r)".

Figure 2:
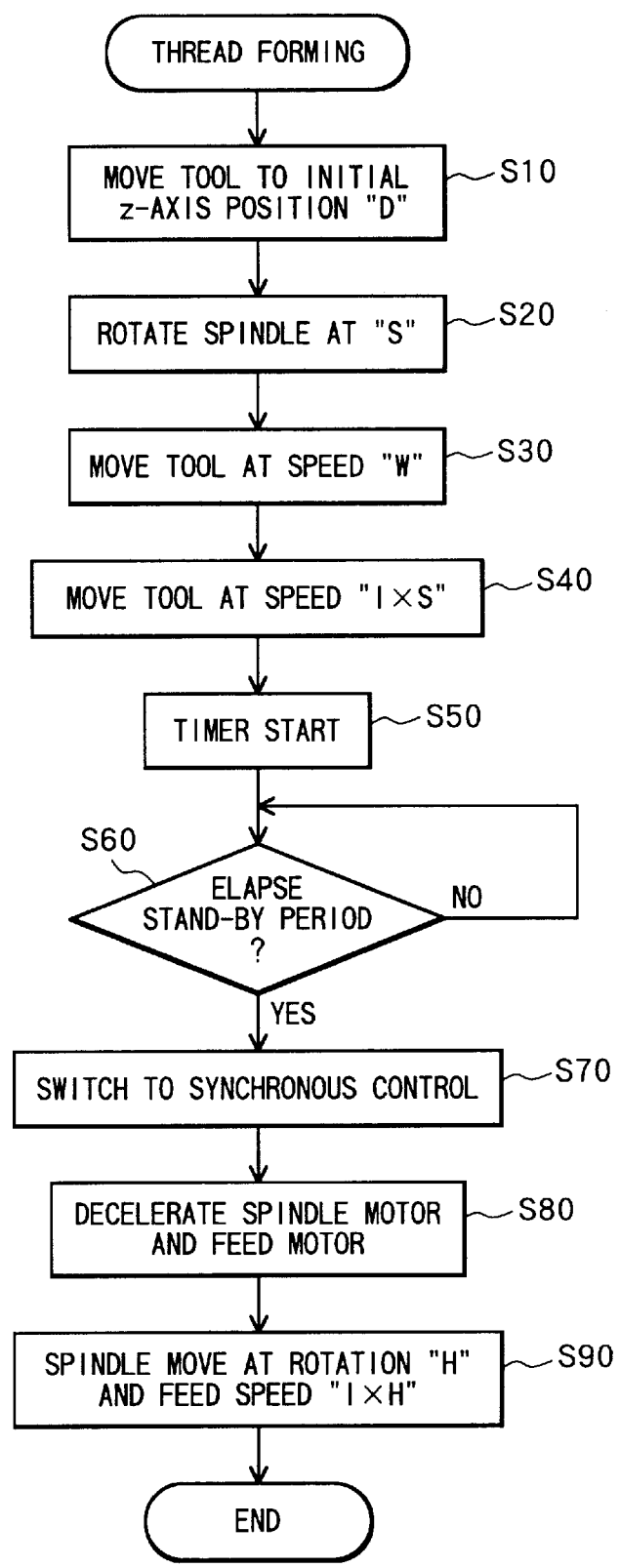
FIG. 2 is a flowchart showing a control routine according to the embodiment.
Figure 3:
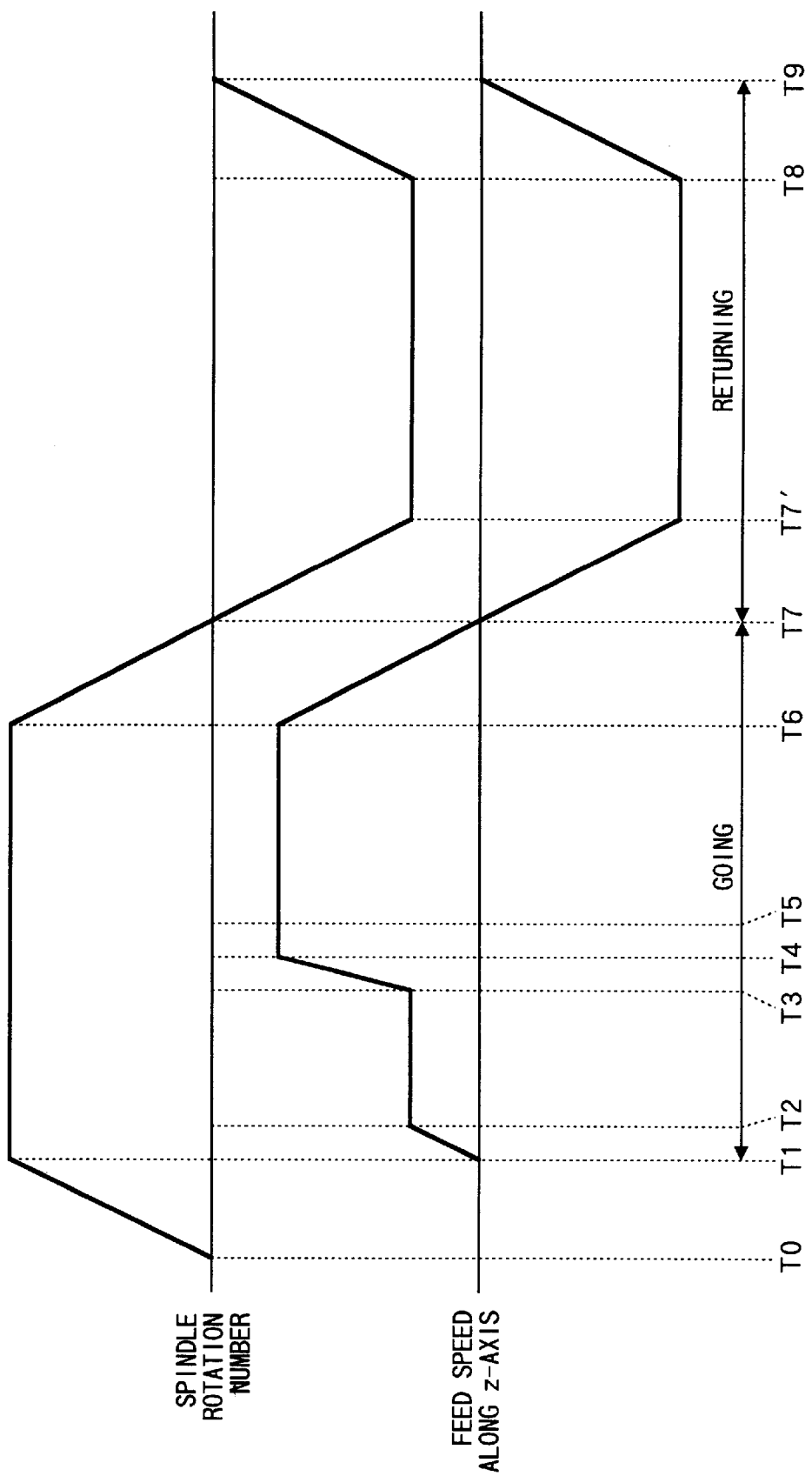
FIG. 3 is a time chart showing a boring and a subsequent tapping operation according to the embodiment.
Figure 4:
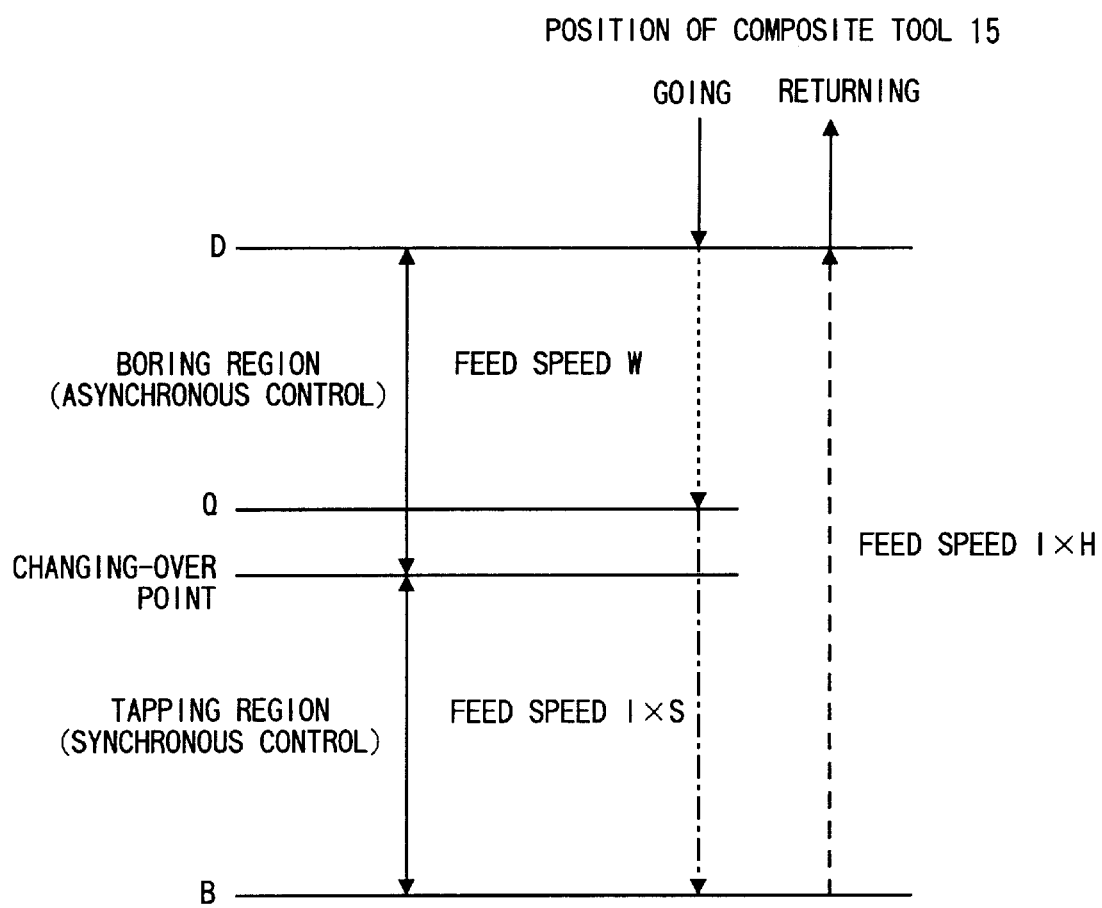
FIG. 4 is an explanatory diagram showing an operational sequence in terms of a position and speed of the composite tool relative to various points and regions according to the present embodiment.

Next, a controlling process executed by the NC including the computing element 22 in the vertical drilling machine 1 for boring and tapping the workpiece 17 will be described with reference to a flowchart shown in FIG. 2, a time chart shown in FIG. 3 and an operational sequence shown in FIG. 4. Incidentally, the controlling process described below is performed based on a machining program previously stored in the computing element 22 or input into the computing element 22 through the operation of the input device 56 by an operator.

For boring and tapping program, the following machining commands are provided:

G**: execution command for executing the machining program;

B: Z axis position of a bottom end of the thread;

D: initial Z axis position of the composite tool 15;

I: thread pitch in the tapping region;

S: rotation number (r.p.m.) of the spindle 11 in the tapping region;

H: rotation number (r.p.m.)of the spindle during return of the spindle from the point B to the point D;

Q: speed changing point along Z-axis feed (a distance from the point D);

J: dwell period at the point Q (machine stopping period);

W: Z axis speed in the boring region;

In the above parameters, B through W are parameters for determining a specification of a female screw. Further, the dwell period J can be dispensed with. Furthermore, the spindle rotation number "H" can also be dispensed with. In the latter case, the spindle rotation "S" is used instead of "H".

If the above machining commands are input into the computing element 22, a machining program for formation of a tap is executed based on the machining commands. That is, the feed command values "Z" and "QZ", the rotation command value "R", the pitch "P" of the ball screw 6, the lead "L" of the ball screw 6, and the change-over signal "C" are output to the predetermined locations at a predetermined time in order to control the Z-axis feed system and the spindle rotation system.

First, the change-over signal "C" is output to the change-over switches 61a and 61b, so that the computing element 22 is connected to the second deviation counter 30 and the second adder 28 as shown in FIG. 1 in order to perform the asynchronous control. Then, in S10, the feed command value "Z" is output to the first deviation counter 23 and to the first adder 29 for driving the feed motor 7 in order to position the composite tool 15 to the initial Z-axis position "D".

Next, in S20, the rotation command value "R" is output to the second deviation counter 30 and to the second adder 28 for driving the spindle motor 12 at the maximum acceleration in order to finally rotate the spindle 11 at the rotation numbers "S" r.p.m. Therefore, in the spindle rotation system, the spindle motor 12 is accelerated at the maximum acceleration from the time T0 to T1 until the rotation number of the spindle 11 reaches "S".

Next, in S30 and at the time T1, the feed command value "Z" is output to the first deviation counter 23 and to the first adder 29 for moving the composite tool 15 from the initial position to the point "Q". More specifically, acceleration of the feed motor 7 at the maximum acceleration is started at T1 to get the feed speed "W"(mm/min) at a time T2, and then the feed speed "W" is maintained from the time T2 to a time T3 at which the composite tool 15 reaches the point "Q". During the period of from T2 to T3, the workpiece 17 is bored by the boring section of the composite tool 15.

At the time T3, the composite tool 15 reaches the point "Q". In S40, the feed command value "Z" is output to the first deviation counter 23 and to the first adder 29 for accelerating the feed motor 7 at the maximum acceleration in order to move the composite tool 15 at a targeting speed "I×S" mm/min at a time T4.

In the asynchronous control, and particularly from the time T0 to T1, T1 to T2, and T3 to T4, the spindle motor 12 or the feed motor 7 is accelerated at respective maximum acceleration. Therefore, boring period can be reduced.

During the period of from T3 to T4, feed speed along the Z-axis is changed from "W" which is required for boring in the asynchronous control to "I×S" which is required for tapping in the synchronous control.

Because the feed speed of the feed motor 7 is changed to the target speed, which contains the factor "S" associated with the rotation number of the spindle motor 12, at the feed speed changing point "Q" by controlling the Z-axis feed system which has been under asynchronous control, the switching from the asynchronous control to the synchronous control can be made with an optimum feed speed of the feed motor, taking the present rotation number of the spindle motor 12 into consideration. Consequently, machining accuracy can be enhanced.

Then in S50, time counting by a timer is started at the time T4, and in S60 judgment is made as to whether or not a predetermined stand-by period counted by the timer has been elapsed. If the predetermined stand-by period has been elapsed (S60:Yes), the routine goes into S70. On the other hand, if the determination falls negative, the judgment will be repeated. The stand-by period in connection with the steps S50 and S60 corresponds to an inherent delay of the feed motor 7 until the feed motor 7 responds to the feed command value "Z". This stand-by period is represented by the following equation:

$$\text{Standby period (sec)} = \text{delay period of the feed motor 7} \\ = \frac{100 - \text{feed forward amount (\%) along Z axis}}{100 \times \text{loop gain (sec}^{-1}) \text{ at Z axis position}}$$

Generally, the delay occurs by a gain constant with respect to the feed command value "Z". Therefore, the stand-by period or waiting period corresponding to the delaying period is required. Further, the feed-forward control performed in the asynchronous control is also taking into consideration in the stand-by period.

Since the switching from the asynchronous control to the synchronous control is suspended by a predetermined stand-by period because the response delay of the Z-axis feed system is taking into consideration, the feed motor 7 and the spindle motor 12 are driven in synchronism with each other during the synchronous control without any synchronization error. Thus, machining accuracy can be improved.

At a time T5, the composite tool 15 reaches a change-over point, where a tapping section of the composite tool reaches the workpiece 17, whereupon in S70 the change-over signal "C" is transmitted to the change-over switches 61a, 61b for connecting the rotation correction computing element 31 to the second deviation counter 30 and for connecting the rotation command computing element 27 to the second adder 28, and further, the feed command value "QZ" is output to the first deviation counter 23 and to the first adder 29. By the step S70, the asynchronous control is switched to the synchronous control where the Z-axis system and the spindle rotation system are to be driven by the feed command value "QZ". From the step S70, the tapping is started to be performed on the workpiece 17 by the tapping section of the composite tool 15.

Then, in S80 and at a time T6, the feed command value "QZ" is transmitted to the first deviation counter 23 and the first adder 29, so that the rotation speed of the spindle 11 and feeding speed of the spindle head in the Z-axis can be decelerated at a lower one "A" of the maximum acceleration "Ar" of the spindle rotation and the maximum acceleration "Az" of the spindle head feed speed from the time T6 to a time T7. Accordingly, in the Z-axis system and the spindle rotation system, the feed motor 7 and the spindle motor 12 are decelerated with the lower one of the maximum accelerations "Az" and "Ar", and are then stopped.

Next, at the time T7, the tapping section of the composite tool 15 reaches the point "B". In S90, returning stroke control is executed with maintaining the synchronous control. More specifically, from the time T7, the feed command value "QZ" is transmitted to the first deviation counter 23 and the first adder 29, so that the rotation speed of the spindle 11 and feeding speed of the spindle head in the Z-axis can be accelerated at a lower one "A" of the maximum acceleration "Ar" of the spindle rotation and the maximum acceleration "Az" of the spindle head feed speed to obtain the spindle rotation number of "H" r.p.m., and to obtain the feeding speed of "I×H"(mm/min) at a time T7'. Further, from a time T8 to T9, the feed command value "QZ" is transmitted to the first deviation counter 23 and the first adder 29, so that the rotation speed of the spindle 11 and feeding speed of the spindle head in the Z-axis can be decelerated at a lower one "A" of the maximum acceleration "Ar" of the spindle rotation and the maximum acceleration "Az" of the spindle head feed speed to finally stop rotation and feed of the spindle. Accordingly, from the time T7' to the time T8, the spindle is rotated at a constant rotation number "H", and is fed at a constant speed "I×H", and then the composite tool 15 returns to the point D at T9.

In the synchronous control, and particularly from the time T6 to T9, the spindle motor 12 and the feed motor 7 are accelerated or decelerated at the lower one of the maximum acceleration of the spindle motor and the maximum acceleration of the feed motor. Therefore, application of overload to either one of the spindle motor and the feed motor can be prevented, so that prolonged service life of these motors can result.

In the conventional boring and tapping method, rotation number of the spindle at the boring is made different from that at the tapping while changing a thread forming pitch by employing the function generator and performing entire machining by a synchronous control. Accordingly, the spindle rotation system may be affected in respect of a time delay by the Z-axis feed system. However, according to the above described embodiment, since asynchronous control for boring is switched to synchronous control for tapping, and it is unnecessary to change thread forming pitch, the problem of time delay does not occur between the spindle rotation system and the Z-axis feed system. Thus, in the present invention, a swell of rotation of the spindle does not occur. Thus, the workpiece can be formed with a female thread with a high machining accuracy.

While the invention has been described in detail and with reference to the specific embodiments thereof, it would be apparent to those skilled in the art that various changes and modifications may be made therein without departing from the spirit and scope of the invention. For example, in the above-described synchronous control, the feed motor 7 is traced by the spindle motor 12. That is, the rotation command value "R" is formed based on the feed command value "QZ". However, reverse control can be made such that the spindle motor 12 is traced by the feed motor 7 in the synchronous control.

Further, in the above described steps S50 and S60, a parameter can be added into the machining command so as to modify the standby period by the operator. Such modification is advantageous for the purpose of avoiding lowering of the machining accuracy, the lowering being caused by a displacement of the response delay of the feed motor 7 due to various conditions such as a machining temperature variation.

Further, in the above described embodiment, the timer counting is started at the time T4 at which the feed motor 7 reaches the target speed for providing the standby period from the time T4 to T5 in order to set the predetermined time interval in the shift from the asynchronous control to the synchronous control. Because the standby period is provided until the response delay of the feed motor 7 is converged, the start timing of counting is not limited to the time T4 but can be set to the machining start timing or other timing, and the counting can be ended at the time T5.

Further, in the above described embodiment, synchronous control is performed during all return stroke of the composite tool from the thread bottom "B" to the initial position "D" after formation of the female screw in the workpiece. However, similar to the control in the going stroke, the synchronous control is performed only in the tapping region during the return stroke, and then asynchronous control can be performed in the boring region during the return stroke. In the latter case, since high feed speed of the feed motor 7 can be set in the return stroke, an entire period of return stroke can be shorter than that in the case where entire return stroke is performed with the synchronous control.

What is claimed is:

1. A control device for controlling a tapping device for forming a female thread in a workpiece, the tapping device including:

a composite tool having a boring section and a tapping section axially aligned therewith;

a spindle rotatable about its axis and movable in an axial direction thereof, the composite tool being attached to the spindle with the boring section being a tip end;

rotation drive means that rotates the spindle about its axis; and feed drive means that moves the spindle in the axial direction toward and away from the workpiece, the female thread being formed in the workpiece in a going stroke of the composite tool and the composite tool is separated from the workpiece in a return stroke thereof; the control device comprising:

asynchronous control means that controls the rotation drive means and the feed drive means independently of each other;

synchronous control means that control the rotation drive means and the feed drive means in synchronism with each other; and change-over control means for first controlling the asynchronous control means to control said rotation drive means and said feed drive means to form a bore in the workpiece by the boring section of the composite tool, and for then controlling the synchronous control means to control the rotation drive means and the feed drive means to form the female thread at the bore by the tapping section of the same composite tool by the time the tapping section reaches the workpiece.

2. The control device as claimed in claim 1, wherein the feed drive means provides a first feed speed for boring with the boring section of the composite tool and a second feed speed for tapping with the tapping section of the composite tool;

and wherein the change-over control means comprises:
means for controlling the feed drive means to change a feed speed of the spindle from the first feed speed to the second feed speed; and means for executing a change-over operation from the asynchronous control to the synchronous control after the feed speed is change to the second feed speed.

3. The control device as claimed in claim 2, wherein the executing means comprises:

a timer that starts time counting when the feed speed is changed to the second feed speed; and means for determining as to whether or not a predetermined standby period has been elapsed from a start of the timer, the predetermined period corresponding to a period during which the second feed speed is stabilized; and means for changing over to the synchronous control when the determining means determines that the predetermined period has been elapsed.

4. The control device as claimed in claim 2, wherein the executing means comprises:

a timer that starts time counting when the tapping device starts machining;

means for determining as to whether or not a predetermined standby period has been elapsed from a start of the timer, the predetermined period corresponding to a period during which the second feed speed is stabilized; and means for changing over to the synchronous control when the determining means determines that the predetermined period has been elapsed.

5. The control device as claimed in claim 1, wherein the feed drive means comprises a feed motor providing a first maximum acceleration, and the rotation drive means comprises a spindle motor providing a second maximum acceleration;

and wherein the asynchronous control means comprises means for accelerating and decelerating the feed motor and the spindle motor at the first maximum acceleration and second maximum acceleration, respectively for boring.

6. The control device as claimed in claim 5, wherein the synchronous control means comprises means for accelerating and decelerating the feed motor and the spindle motor at a lower one of the first maximum acceleration and second maximum acceleration for tapping.

7. The control device as claimed in claim 6, wherein the change-over control means further comprises:

means for performing the synchronous control in the return stroke if the tapping section passes through a tapping region where the female thread is already formed in the going stroke; and means for changing over to the asynchronous control in the return stroke if the composite tool passes through a boring region where a bore is formed by the boring section in the going stroke.

8. The control device as claimed in claim 5, wherein the asynchronous control means comprises a Z-axis feed control system comprising:

a computing element computing a first feed command value based on the first maximum acceleration;

a first deviation counter connected to the feed drive means and to the computing element, the first feed command value being transmitted to the first deviation counter;

a first adder connected to the first deviation counter and to the computing element; and a Z-axis servo amplifier connected to the first adder and to the feed drive means.

9. The control device as claimed in claim 8, wherein the feed drive means comprises:

a feed motor that moves the spindle in its axial direction toward and away from the workpiece, the feed motor being connected to the Z-axis servo amplifier;

a first pulse generator generating a pulse indicative of a feed position of the spindle, the first pulse generator being connected to the first deviation counter where a first deviation between the first feed command value and the feed position is computed, the first adder adding the first deviation to the first feed command value to create a first speed command; and a first tacho generator generating a first speed signal indicative of rotation speed of the feed motor, the first tacho generator being connected to the Z-axis servo amplifier for controlling the rotation of the feed motor based on the first speed signal and the first speed command.

10. The control device as claimed in claim 9, wherein the asynchronous control means comprises a spindle rotation control system comprising:

the computing element computing a first rotation command value based on the second maximum acceleration;

a second deviation counter connected to the rotation drive means and to the computing element, the first rotation command value being transmitted to the second deviation counter;

a second adder connected to the second deviation counter and to the computing element; and a spindle servo amplifier connected to the second adder and to the rotation drive means.

11. The control device as claimed in claim 10, wherein the rotation drive means comprises:

a spindle motor that rotates the spindle about its axis, the spindle motor being connected to the spindle servo amplifier;

a second pulse generator generating a pulse indicative of a rotation angle of the spindle motor, the second pulse generator being connected to the second deviation counter where a second deviation between the first rotation command value and the rotation position of the spindle motor is computed, the second adder adding the second deviation to the first rotation command value to create a second speed command; and a second tacho generator generating a second speed signal indicative of rotation speed of the spindle motor, the second tacho generator being connected to the spindle servo amplifier for controlling the rotation of the spindle motor based on the second speed signal and the second speed command.

12. The control device as claimed in claim 11, wherein the synchronous control means comprises a Z-axis feed control system comprising:

the computing element computing a second feed command value;

the first deviation counter connected to the feed drive means and to the computing element, the second feed command value being transmitted to the first deviation counter;

the first adder connected to the first deviation counter and to the computing element; and the Z-axis servo amplifier connected to the first adder and to the feed drive means.

13. The control device as claimed in claim 12, wherein the feed drive means comprises:

the feed motor that moves the spindle in its axial direction toward and away from the workpiece, the feed motor being connected to the Z-axis servo amplifier;

the first pulse generator generating the pulse indicative of the feed position of the spindle, the first pulse generator being connected to the first deviation counter where a third deviation between the second feed command value and the feed position is computed, the first adder adding the third deviation to the second feed command value to create a third speed command; and the first tacho generator generating the first speed signal indicative of a rotation speed of the feed motor, the first tacho generator being connected to the Z-axis servo amplifier for controlling the rotation of the feed motor based on the first speed signal and the third speed command.

14. The control device as claimed in claim 13, wherein the feed drive means further comprises a ball screw having a pitch and a lead;

and wherein the synchronous control means comprises a spindle rotation control system comprising:

the computing element computing a second rotation command value based on the second feed command value;

an acceleration computing element connected to the computing element, the acceleration computing element computing a feed acceleration based on the second feed command value;

a third adder connected to the acceleration computing element and to the feed drive means for adding the feed position and the feed acceleration;

a rotation command computing element connected to the third adder and to the computing element for forming a third rotation command value based on the addition of the feed position and the feed acceleration and on the lead and the pitch;

a rotation correcting computing element connected between the computing element and the feed drive means for forming a rotation correcting value based on the feed position, the pitch and the lead;

the second deviation counter connected to the feed drive means and to the rotation correcting computing element to compute a rotation deviation which is a deviation between the rotational position of the spindle and the rotation correcting value;

the second adder connected to the second deviation counter and to the rotation command computing element to form a corrected rotation command value which is an addition of the third rotation command value and the rotation deviation; and the spindle servo amplifier connected to the second adder and to the rotation drive means for controlling the rotation of the spindle motor based on the second speed signal and the corrected rotation command value.

15. The control device as claimed in claim 14, wherein the third adder is connected to the first pulse generator, and the rotation correcting computing element is also connected to the first pulse generator.

16. The control device as claimed in claim 15, wherein the change-over control means comprises:

a first change-over switch selectively providing a first change over position for connecting the second deviation counter to the computing element to provide the asynchronous control means, and a second change over position for connecting the second deviation counter to the rotation correcting computing element to provide the synchronous control means; and a second change-over switch selectively providing a first change over position for connecting the second adder to the computing element to provide the asynchronous control means, and a second change over position for connecting the second adder to the rotation command computing element to provide the synchronous control means.

17. The control device as claimed in claim 16, wherein the second feed command value is based on a lower one of the first maximum acceleration and the second maximum acceleration.

18. A control device for forming a bore in a workpiece and then for forming a female thread at the bore in the workpiece, the device comprising:

a spindle rotatable about its axis and movable in an axial direction thereof;

a composite tool attached to the spindle, the composite tool having a boring section and a tapping section axially aligned therewith, the composite tool being attached to the spindle with the boring section being a tip end;

rotation drive means that rotates the spindle about its axis;

feed drive means that moves the spindle in the axial direction toward and away from the workpiece;

asynchronous control means that controls the rotation drive means and the feed drive means independently of each other;

synchronous control means that controls the rotation drive means and the feed drive means in synchronism with each other; and change-over control means for first controlling the asynchronous control means to control the rotation drive means and the feed drive means to form the bore in the workpiece by the boring section of the composite tool in a going stroke of the composite tool, and then, by the time the tapping section reaches the workpiece, controlling the synchronous control means to control the rotation drive means and the feed drive means to form the female thread at the bore by the tapping section of the same composite tool, the female thread being formed at the bore by the tapping section of the composite tool also in the going stroke of the composite tool and the composite tool being separated from the workpiece in a return stroke thereof.

19. The control device as claimed in claim 18, wherein the feed drive means provides a first feed speed for boring with the boring section of the composite tool and a second feed speed for tapping with the tapping section of the composite tool;

and wherein the change-over control means comprises:
means for controlling the feed drive means to change a feed speed of the spindle from the first feed speed to the second feed speed; and
means for executing a change-over operation from the asynchronous control to the synchronous control after the feed speed is change to the second feed speed.

20. The control device as claimed in claim 19, wherein the executing means comprises:

a time that starts time counting when the feed speed is changed to the second feed speed;

means for determining as to whether or not a predetermined standby period has elapsed from a start of the timer, the predetermined period corresponding to a period during which the second feed speed is stabilized; and
means for changing over to the synchronous control when the determining means determines that the predetermined period has elapsed.

21. The control device as claimed in claim 19, wherein the change over control means further comprises machining start means for starting machining of the workpiece with the composite tool by starting the control to the asynchronous control means; and wherein the executing means comprises:
a timer that starts time counting when the machining start means starts machining with the composite tool;
means for determining as to whether or not a predetermined standby period has elapsed from a start of the timer, the predetermined period corresponding to a period during which the second feed speed is stabilized; and
means for changing over to the synchronous control when the determining means determines that the predetermined period has elapsed.

* * * * *